Oct. 27, 1931.　　　J. P. SEAHOLM　　　1,829,545
VARIABLE WIDTH PLOW
Filed Oct. 5, 1929　　　3 Sheets-Sheet 1
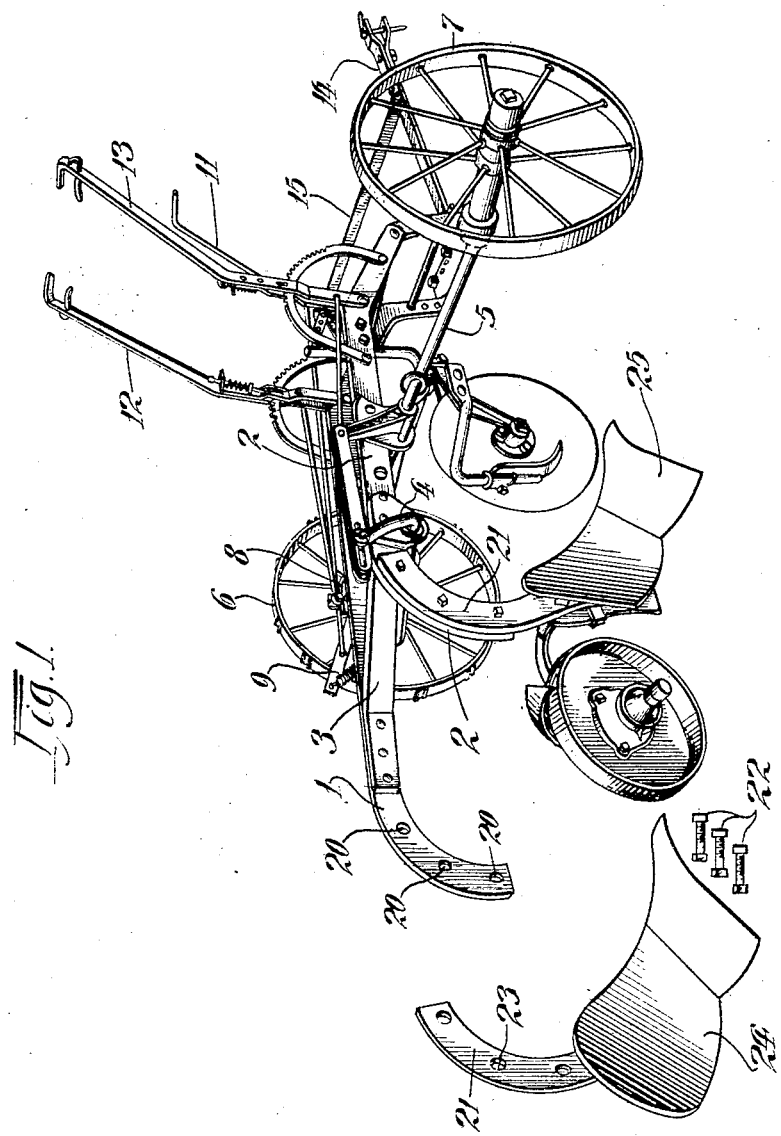

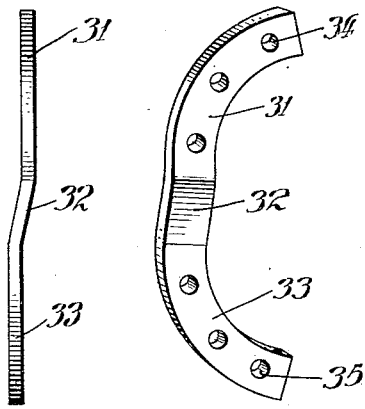
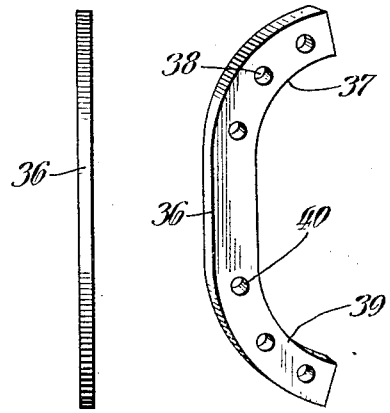
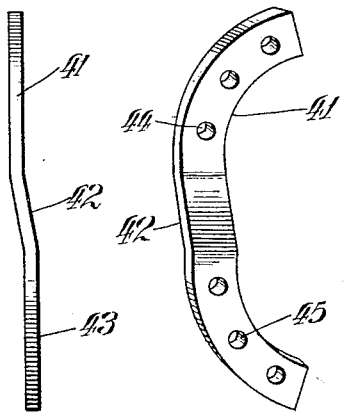
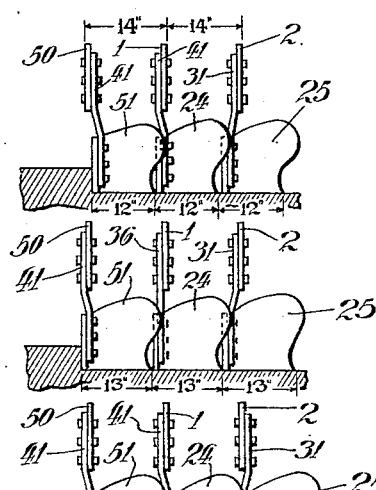
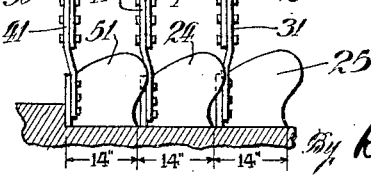

Oct. 27, 1931.   J. P. SEAHOLM   1,829,545
VARIABLE WIDTH PLOW
Filed Oct. 5, 1929   3 Sheets-Sheet 3

Inventor
John P. Seaholm
By Rector, Hibben, Davis, Macauley
Attorneys

Patented Oct. 27, 1931

1,829,545

UNITED STATES PATENT OFFICE

JOHN P. SEAHOLM, OF MOLINE, ILLINOIS, ASSIGNOR TO MINNEAPOLIS-MOLINE POWER IMPLEMENT COMPANY, OF MOLINE, ILLINOIS, A CORPORATION OF DELAWARE

VARIABLE-WIDTH PLOW

Application filed October 5, 1929. Serial No. 397,598.

This invention relates to a variable-width plow. It is particularly applicable to a plow having two or more plow bodies, usually called a "gang plow", but it is not confined in its application to gang plows, being useful with other kinds of plows as well.

Gang plows, particularly those of the tractor type, such as illustrated in Boda Patent No. 1,669,037, are provided with two or more beams that are spaced a fixed distance apart, the distance depending upon the size of the plow bodies that are attached directly to the beams. If 10-inch plow bodies are to be attached to the beams the beams are spaced the proper distance apart to enable the two 10-inch plow bodies to operate together to take a 20-inch cut. If 14, 16, or 18-inch plow bodies are to be used, the beams are spaced distances apart corresponding to the size of the plow bodies used, each plow having a fixed width of cut. The spacing of the beams is determined at the factory and the beams are rigidly assembled together so that after the plow is built no adjustment of the spacing of the beams is possible.

About fifty percent of the oil and gas consumed by a tractor used for plowing is used in transporting the tractor itself which makes it evident that, for the most economical consumption of fuel and oil, the mileage of the tractor should be reduced to the minimum by always loading the tractor to its fullest plowing capacity. However, this plowing capacity varies with the nature of the soil, the condition of the soil at time of plowing, the contour of the field being plowed, etc. For some fields a farmer's tractor may be able to pull only a plow taking a twenty-inch cut while in other fields or at a different time of year the tractor may be able to pull a plow taking a forty-two inch cut or some width of cut between twenty and forty-two inches.

With the ordinary gang plow no substantial variation in width of cut can be obtained. If a farmer has a plow whose beams are spaced apart for ten-inch plow bodies taking a twenty-inch cut, desires to plow a thirty-inch or a thirty-six inch cut, he must employ a different plow, namely, one having its beams spaced apart the proper distance for the width of plow bodies necessary for the desired width of cut. This requires that, in order to be equipped to use his tractor at maximum plowing capacity under all conditions, he must have a variety of plows on hand which means a duplication of plow beams, ground wheels, lifting mechanism, draft structure and adjusting levers, a duplication that is expensive and economically wasteful.

The present invention is directed to a solution of this above problem.

A more particular object is to provide a plow to which a variety of widths of plow bodies may be attached for taking different widths of cut.

Other objects and advantages of the invention will appear from the following specification and drawings.

An embodiment of the invention is shown in the accompanying drawings in which:—

Figure 1 is a perspective view of the improved plow.

Fig. 2 is an end elevation of one of the connecting pieces used with the plow.

Fig. 3 is a perspective view of the connecting piece shown in Fig. 2.

Fig. 4 is an end view of another connecting piece used with the plow.

Fig. 5 is a perspective view of the end piece illustrated in Fig. 4.

Fig. 6 is an end elevation of still another connecting piece used with the plow.

Fig. 7 is a perspective view of the connecting piece shown in Fig. 6.

Figs. 8, 9 and 10 are diagrammatic views showing various connections of the plow bodies to the plow beams in a three-body plow.

Figure 11:
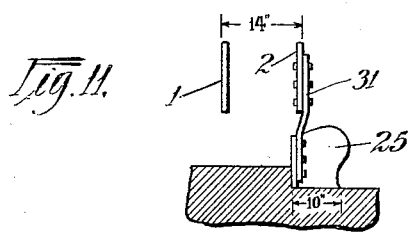

Figs. 11 to 20, inclusive, are diagrammatic illustrations of various combinations of plow bodies with a pair of plow beams for obtaining different widths of furrows.

Inasmuch as the lifting mechanism, the adjustments, the draft connections and portions of the beam structure are well known in the art and are described in a number of patents these constructions will be described only briefly here.

The plow includes two plow beams 1 and 2 connected together by a rear brace 3. The beams 1 and 2 are made of rectangular metal bars having their greatest width in vertical planes as clearly appears in Fig. 1, the assembly of the beam structure being illustrated and described in detail in Bradley Patent No. 1,542,364 to which reference is made.

The beam structure is supported by two crank axles 4 and 5 on which are journaled the respective ground wheels 6 and 7. The plow is raised and lowered by a mechanical power lift 8 operated by rotation of one of the ground wheels and controlled by a lever 9 through a link 10 and a hand lever 11. The details of this lifting mechanism are disclosed in Boda patent referred to.

The crank axles 4 and 5 may be adjusted to various positions through the medium of hand levers 12 and 13, the connections controlled by these levers and the cooperation of the levers with the lifting mechanism being also described in said Boda patent.

The plow is adapted to be connected to a tractor through the medium of a hitch bar 14 having an adjustable connection 15 which acts in cooperation with the power lift mechanism in the raising of the plow as described in Boda Patent No. 1,603,019.

As shown in Boda Patent No. 1,669,037, the usual practice is to bend the rear ends of the plow beams downwardly and to attach the plow bodies directly to them. The greatest strain on the beams is usually at the bends where there is not only a strain tending to straighten out the beams but there is often a twisting strain to the right or left. Plows of this type are usually drawn by a tractor which has a relatively large tractive effort so that if the plow should strike such an obstruction such as a hidden stump or rock, a very great strain will result owing to the force with which the plow is being drawn forward.

The conditions affecting the beams are such that it has been considered more or less impractical to have the rear ends of plow beams broken, that is, made in more than one piece with a joint between the parts. The reason for this is that the strains are such that the joints will not usually hold up and still be such that they can be adjusted.

The present invention comprehends not only a disconnectible connection at the bends in the plow beams but one that is readily disconnectible and readily adjustable in such a way as to enable different widths of plow bodies to be attached to the beams so as to space them the proper distance apart for plowing different widths of furrows.

Instead of connecting the rear curved ends of the plow beams directly to the plow bodies, these curved ends are made shorter than usual and provided with a plurality of holes 20, three being shown in the present instance. Curved connecting pieces, indicated generally by the reference numeral 21, are attached to the plow beams by means of bolts 22 that pass through holes 23 in the connecting pieces and the corresponding holes 20 in the plow beams, the contacting faces of the beams and connecting pieces being flat. These curved connecting pieces have the same radius of curvature as the curved ends of the plow beams as illustrated in Fig. 1 where one of the connecting pieces is shown disconnected and the other connected. The connecting pieces are bolted securely to the sides of the curved ends of the plow beams and this connection is such that the plow beams are really strengthened owing to the fact that there are two widths of metal at the curve instead of one. The curved connecting pieces assist the curved ends of the beams in resisting twisting strains and likewise assist the beams in resisting the strains tending to straighten out the curves, the three bolts that hold the connecting pieces and the beams together being sufficiently strong and being spaced at such points around the curve to the beam so relative movement between the beam and the connecting pieces is impossible. At the same time the connecting pieces may be readily disconnected by loosening the nuts on the bolts and removing the latter.

The plow bodies 24 and 25 are attached to the connecting pieces 21 in the usual way that the bodies are connected to plow beams, the plow bodies being disconnectible from the connecting pieces.

Three types of connecting pieces are used as shown in Figs. 2 and 7, inclusive and these will be referred to by individual reference numerals in order to distinguish them from one another, the pieces being referred to generally by the reference number 21 in Fig. 1.

The first type, which is shown in Figs. 2 and 3, is a left-hand connecting piece 31 having a left-hand offset 32 and a bottom portion 33. The portion 31 has three bolt holes 34 and the portion 33 has three similar bolt holes 35.

The second connecting piece, shown in Figs. 4 and 5, is a straight connecting piece 36 having a curved upper end 37 provided with three bolt holes 38, and a curved lower end 39 provided with bolt holes 40.

The third connecting piece, which is shown in Figs. 6 and 7, is a right-hand connecting piece 41 having a right-hand offset 42 and a curved lower end 43. The portion 41 has three bolt holes 44 and the lower end has three similar bolt holes 45.

It will be evident that the connecting pieces may be attached to either of the sides of the plow beams and this fact, combined with the fact that the right, left and straight connecting pieces may be interchangeably used enables a large number of combinations to be obtained some of which are illustrated in Figs. 11 to 20, inclusive.

When two plow beams are used they are ordinarily spaced 14 inches apart and such spacing has been illustrated in Figs. 11 to 20, inclusive. The spacing of the beams is the same in each of said figures.

Figure 12:
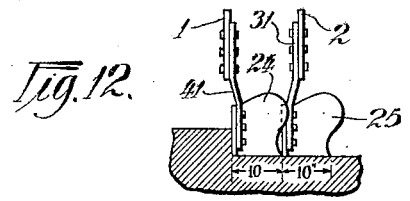

Fig. 12 illustrates two 10-inch plow bodies connected to the plow beams to take a 20-inch cut. In this case a right-hand connecting piece 41 is used for the left-hand plow body 24 and this connecting piece is attached to the right hand side of the plow beam 1. A left-hand connecting piece 31 is used with the right-hand plow body 25, and it is connected to the left-hand side of the beam 2. This places the lower ends of the connecting pieces 41 and 31 considerably closer together than the beams so as to set the plow bodies toward one another to thereby enable the 10-inch bodies to be properly spaced on 14" beams to take a 20-inch cut.

Figure 13:
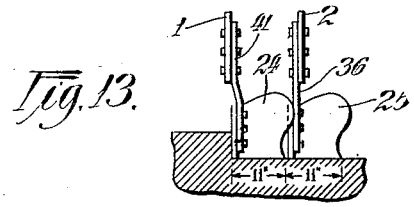

Fig. 13 shows two 11-inch plow bodies connected to take a 22-inch cut. In this case a right-hand connecting piece 41 is used for the left-hand plow body 24 and it is connected to the right hand side of beam 1 the same as in Fig. 12 but a straight connecting piece 36 is used for the right-hand body 25 instead of a left-hand connecting piece as in Fig. 12. The use of a straight connecting piece spaces the right hand plow body 25 to the right about an inch so as to locate said plow body properly relative to the 11-inch plow body 24 which is 1 inch wider than the 10-inch plow body of Fig. 12. This spaces the plow bodies properly for taking a 22-inch cut.

It is not always necessary to use 11-inch plow bodies to plow a 22-inch cut as 10-inch plow bodies may be used with practically the same efficiency. If 10-inch plow bodies are used they are connected to the beams the same as in Fig. 13 in which event there would be about a 1-inch space between the right-hand edge of the left-hand plow body 24 and the left-hand edge of the right-hand plow body 25 but this is so small that the soil would be turned over by the action of the left-hand plow body. In other words, the 10-inch plow body 24, will, in effect, take a 11-inch cut under the conditions named. The right-hand plow body would, in such event, be guided so that its right-hand edge would be about 1 inch inside the furrow wall.

Figure 14:
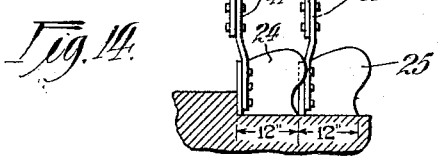

Fig. 14 illustrates two 12-inch plow bodies connected so as to take a 24-inch cut. In this arrangement the left-hand plow body 24 is connected to the beam 1 by means of a right-hand connecting piece 41 the same as in the examples heretofore illustrated and the right-hand plow body 25 is connected to its plow beam 2 by a left-hand connecting piece 31 the same as in Fig. 12 except that the connecting piece is connected to the right-hand side of the plow beam 2 instead of to the left-hand side as in Fig. 12. This spaces the 12-inch plow body two inches farther over to the right than the plow body of Fig. 12 and allows for the two inch increase in width in the 12-inch plow body 24.

Figure 15:
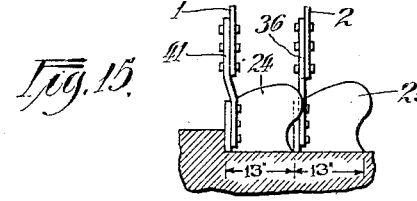

Fig. 15 illustrates two 13-inch plow bodies connected to take a 26-inch cut. In this case the left-hand plow body 24 is connected to its beam 1 by a right-hand connecting piece 41 but the right-hand connecting piece is attached to the left-hand side of the plow beam 1 instead of the right side. This spaces the plow body 24 further to the left as against the examples of Figs. 12 to 14, inclusive. The right-hand plow body 25 is connected to its beam by a straight connecting piece 36. This spaces the two plow bodies three inches farther apart as compared with the spacing of Fig. 12, two inches being obtained by attaching the left-hand connecting piece 41 on the right-hand side of the beam 1 and one inch being obtained by using a straight connecting piece 36 for plow body 25.

Figure 16:
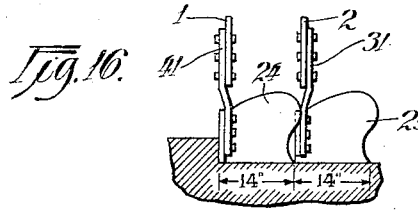

Fig. 16 illustrates two 14-inch bodies connected to take a 28-inch cut. In this case, the left-hand plow body 24 is connected to the beam 1 by means of a right-hand connecting piece 41 attached to the right-hand side of the plow beam 1 the same as in Fig. 15 but the right-hand plow body 25 is spaced over one inch to the right by the use of a left-hand connecting piece 31 attached to the right-hand side of the beam 2.

Figure 17:
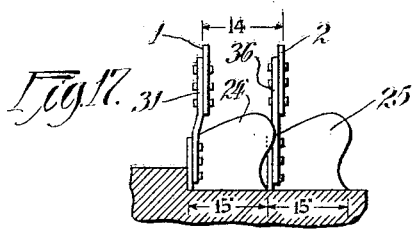

Fig. 17 shows two 15-inch plow bodies connected to take a 30-inch cut. In this case the left-hand plow body 24 is attached to the beam 1 by means of a left-hand connecting piece 31 attached to the left-hand side of the beam. This spaces the plow body 24 considerably to the left and the right-hand plow body 25 is attached to its beam 2 by a straight connecting piece 36. 14-inch plow bodies can be used instead of 15-inch if desired under the same conditions as explained for the 11-inch plow bodies of Fig. 13.

Figure 18:
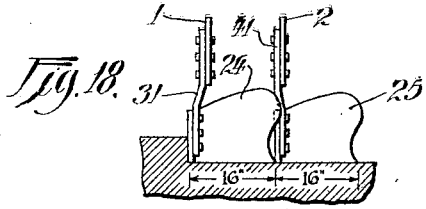

Fig. 18 shows two 16-inch plow bodies attached to take a 32-inch cut. In this case the left-hand plow body 24 is attached to the beam 1 by a left-hand connecting piece 31 attached to the left-hand side of the beam the same as in Fig. 17 and the right-hand plow body 25 is spaced one inch to the right as related to Fig. 17 by the use of a right-hand connecting piece 41 attached to the left-hand side of the beam 2.

Figure 19:
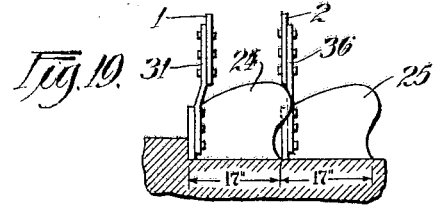

Fig. 19 shows two 17-inch plow bodies connected to take a 34-inch cut. In this case the left-hand plow body 24 is attached to the beam 1 by a left-hand connecting piece 31 the same as in Figs. 17 and 18 and the right-hand plow body 25 is spaced one inch farther to the right than in Fig. 18 by the use of a straight connecting piece 36 attached to the right-hand side of the beam 2. If preferred, 16-inch plow bodies may be used in this case under the same conditions as explained for the 11-inch plow bodies of Fig. 13.

Figure 20:
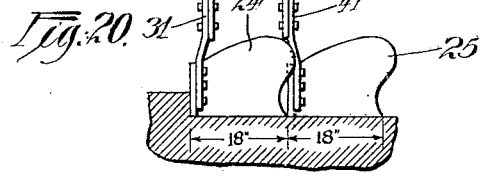

Fig. 20 shows two 18-inch plow bodies connected to take a 36-inch cut. In this case the left-hand plow body 24 is attached to the plow beam 1 by a left-hand connecting piece 31 attached to the left-hand side of the beam 1 and the right-hand plow body 25 is spaced one inch farther to the right than in Fig. 19 by the use of a right-hand connecting piece 41 attached to the right-hand side of the beam 2.

Other widths of plow bodies and other combinations and arrangement of connecting pieces can be used, it being clear that, with three kinds of connecting pieces that may be attached to either the inside or the outside of the beams, the plow bodies may be spaced at varying distances apart to secure proper positioning for various widths of plow bodies.

The rear furrow wheel 26 is automatically positioned properly relative to the plow bodies in all cases because it is removably attached to the side of the plow bodies instead of to the plow beam as is usually the case.

While quite a large number of different widths of plow bodies have been shown in Figs. 12 to 20, inclusive, it is not necessary for a farmer to have all these widths of bodies. It is usually sufficient if he has a set of 14-inch and a set of 18-inch bodies. By varying the relative position of the 14-inch plow bodies they can be used for cuts from 20 to 30 inches in width. For cuts under 28 inches the paths of the 14-inch plow bodies can be made to overlap while for a 30-inch cut the gap between the bodies is only one inch. In like manner, the 18-inch bodies can be used for cuts from 32 to 38 inches in width.

When three plow beams are used, a variation in width of cut may be obtained in like manner, several examples being shown in Figs. 8, 9, and 10.

Fig. 8 shows three 12-inch plow bodies connected to take a 36-inch cut, the extra plow beam and its plow body being designated as 50 and 51, respectively. In this case the left-hand plow body 51 is connected to the beam 50 by a right-hand connecting piece 41 attached to the right-hand side of the beam. The middle plow body 24 is connected to its beam 1 by a right-hand connecting piece 41 attached to the left-hand side of the beam 1 and the right-hand plow body 25 is connected to its plow beam 2 by a left-hand connecting piece 31 attached to the left-hand side of the beam 2. This spaces the plow bodies apart properly to take a 36-inch cut with no space left between the plow bodies.

Fig. 9 shows three 13-inch plow bodies connected to take a 39-inch cut. In this case the left-hand plow body 51 is attached to its plow beam 50 by a right-hand connecting piece 41 but the connecting piece is attached to the left-hand side of the beam 50 which spaces it two inches farther to the left than in Fig. 8. The middle plow body 24 is connected to its beam 1 by a straight connecting piece 36 which spaces it one inch farther to the left than in Fig. 8. The right-hand plow body 25 is connected to its beam 2 by a left-hand connecting piece 31 attached to the left-hand side of its beam 2 the same as in Fig. 8. This arrangement puts each of the plow bodies next to the other so that each takes a 13-inch cut without any space between the furrows.

Fig. 10 shows three 14-inch plow bodies connected to take a 42-inch cut. In this case the left-hand plow body 51 is connected to its beam 50 by a right-hand connecting piece 41 attached to the left-hand side of its beam the same as in Fig. 9. The middle plow body 24 is spaced one inch farther to the right by the use of a right-hand connecting piece 41 attached to the left-hand side of the middle plow beam 1. The right-hand plow body 25 is spaced two inches farther to the right by the use of a left-hand connecting piece 31 attached to the right-hand side of the beam 2 instead of to the left-hand side as in Fig. 9.

Fig. 11 illustrates a two-beam plow being used as a sulky plow, that is, as a plow having only one plow body. Although different widths of plow bodies may be used, the advantage of the novel connection, as far as using a single plow body is concerned, is not so much in the fact that different widths of plow bodies may be used as it is in the fact that a gang plow may be converted into a sulky plow by simply disconnecting one of the connecting pieces and removing one of the plow bodies. In an ordinary plow such as the plow shown in the Boda patent heretofore referred to, it would be possible to take off one of the plow bodies but the plow beam would project so close to the ground as to dig into it and strike obstructions so as to interfere with the efficient operation of the plow. In the present construction no such action occurs because the end of the plow beam is relatively high above the ground.

It will be readily appreciated that by the use of these simple connecting pieces an almost infinite variety of adjustments may be obtained so that the width of the plow may be varied within wide ranges and this may be done very quickly and easily by disconnecting one set of plow bodies and attaching another with the appropriate connecting pieces. These connecting pieces being simple metal bars with holes in them are relatively inexpensive so that a farmer may have a good supply of them to enable him to use any type desired. Instead of having to buy a new plow when he wants to plow furrows of different widths it is merely necessary to have different widths of plow bodies, all of which may be attached to the same beam structure, ground wheels, lifting mechanism, etc., thereby avoiding duplication in the purchase of the most expensive part of the plow. The improved construction not only reduces the cost to the consumer, namely the farmer, but it reduces manufacturing costs in that the same results are achieved with less material and labor. Also it enables a tractor to be used in the most economical manner for plowing.

Viewed broadly, an economy is effected in that the same results are accomplished in plowing by the use of an implement having less material and workmanship on it than with a corresponding number of plows that would be required to perform the same operation. In other words less steel, less fabrication effort, less transportation of steel and finished goods, less storage space, and less investment in plows and parts are necessary without sacrificing efficiency in the performance of the required work.

It is to be understood that the construction shown is for purposes of illustration and that variations may be made in it without departing from the spirit and scope of the invention as defined by the appended claims.

I claim:

1. A plow having a plow beam provided with a downwardly curved rear end, a curved connecting piece detachably connected to the side of the curved portion of said beam, and a plow body detachably connected to said connecting piece.

2. A plow having a plow beam made of a flat metal bar of rectangular cross-section, said beam being positioned with its greatest width in a substantially vertical plane and having a downwardly curved rear end, a connecting piece made of a metal bar of rectangular cross-section, said connecting piece being bent edgewise and being detachably connected to the side of the curved portion of said beam, and a plow body connected to said connecting piece.

3. A plow having a plow beam provided with a downwardly curved rear end, a connecting piece carrying a plow body, and means for detachably connecting said connecting piece to either side of the curved end of said beam to vary the position of the plow body relative to said beam.

4. A plow having a plow beam provided with a downwardly curved rear end, an offset connecting piece carrying a plow body, and means for detachably connecting said connecting piece to the curved portion of said plow beam on either side of the latter to vary the position of the plow body relative to the plow beam.

5. A plow having plow beams spaced at a fixed distance relative to one another, said plow beams having downwardly curved rear ends, curved connecting pieces carrying plow bodies, and means for detachably connecting said connecting pieces to the curved ends of said beams on either side thereof whereby the spacing of the plow bodies relative to one another may be varied.

6. A plow having plow beams spaced at a fixed distance relative to one another, said plow beams having downwardly curved rear ends, curved offset connecting pieces carrying plow bodies, and means for detachably connecting said connecting pieces to the curved ends of said beams on either side thereof whereby the spacing between the plow bodies may be varied.

7. A plow having plow beams with downwardly curved rear ends spaced at fixed distances apart, plow bodies for connection to the curved ends of said beams, and connecting means for detachably connecting said plow bodies to said curved ends, said connecting means being so shaped and the connection to the beams being such that the position of the plow bodies relative to the beams may be varied laterally in both directions from a central position.

8. A plow having plow beams spaced at a fixed distance relative to one another, said plow beams having downwardly curved rear ends, curved connecting pieces carrying plow bodies, some of said connecting pieces being flat and others being offset, and means for connecting said connecting pieces on either side of the curved portions of said beams whereby a wide variety of spacing of the plow bodies may be obtained.

In testimony whereof, I have subscribed my name.

JOHN P. SEAHOLM.